(12) United States Patent
Alasia et al.

(10) Patent No.: US 7,512,249 B2
(45) Date of Patent: Mar. 31, 2009

(54) SYSTEM AND METHOD FOR DECODING DIGITAL ENCODED IMAGES

(75) Inventors: Alfred V. Alasia, Lake Worth, FL (US); Alfred J. Alasia, Royal Palm Beach, FL (US); Thomas C. Alasia, Lake Worth, FL (US); Slobodan Cvetkovic, Lake Worth, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 880 days.

(21) Appl. No.: 11/068,350

(22) Filed: Feb. 28, 2005

(65) Prior Publication Data

US 2005/0237577 A1      Oct. 27, 2005

Related U.S. Application Data

(60) Provisional application No. 60/565,300, filed on Apr. 26, 2004.

(51) Int. Cl.
*G06K 9/00* (2006.01)
*G06K 9/46* (2006.01)
*H04L 9/00* (2006.01)

(52) U.S. Cl. .......................... 382/100; 382/190
(58) Field of Classification Search ................. 382/100, 382/135, 190, 218, 232, 233; 235/454, 462, 235/465, 469, 494; 713/150, 168, 170, 176, 713/179; 380/5, 51, 54, 206, 239; 283/17, 283/86, 93, 901; 348/461, 467, E7.061; 358/3.28
See application file for complete search history.

(56) References Cited

U.S. PATENT DOCUMENTS

| | | | |
|---|---|---|---|
| 2,952,080 A | 9/1960 | Avakian et al. | |
| 3,784,289 A | 1/1974 | Wicker | |
| 3,875,375 A * | 4/1975 | Scuitto et al. | 235/380 |
| 3,922,074 A | 11/1975 | Ikegami et al. | |
| 3,937,565 A | 2/1976 | Alasia | |
| 4,689,477 A * | 8/1987 | Goldman | 235/380 |
| 4,914,700 A | 4/1990 | Alasia | |
| 5,113,213 A | 5/1992 | Sandor et al. | |

(Continued)

FOREIGN PATENT DOCUMENTS

EP      0 520 363 A1      12/1991

(Continued)

OTHER PUBLICATIONS

European Search Report, EP 05790015.1, mailed Apr. 28, 2008, 10 pages.

(Continued)

*Primary Examiner*—Amir Alavi
(74) *Attorney, Agent, or Firm*—Hunton & Williams LLP

(57) ABSTRACT

A method is presented for decoding an encoded image produced from a primary image and at least one secondary image using at least one encoding parameter. The encoded image is formed so that when the encoded image is printed, the secondary image is not discernible to a viewer without an optical decoding device having characteristics corresponding to the at least one encoding parameter. The method comprises obtaining a digital version of the encoded image, determining the at least one encoding parameter, and constructing a decoded image from the digital encoded image using at least one of the encoding parameters in the encoding parameter set.

18 Claims, 11 Drawing Sheets

U.S. PATENT DOCUMENTS

| | | |
|---|---|---|
| 5,178,418 A | 1/1993 | Merry et al. |
| 5,303,370 A * | 4/1994 | Brosh et al. ............... 380/51 |
| 5,396,559 A | 3/1995 | McGrew |
| 5,426,700 A * | 6/1995 | Berson ............... 713/186 |
| 5,438,429 A | 8/1995 | Haeberli et al. |
| 5,708,717 A | 1/1998 | Alasia |
| 5,712,731 A | 1/1998 | Drinkwater et al. |
| 5,735,547 A | 4/1998 | Morelle et al. |
| 5,771,292 A * | 6/1998 | Zunquan ............... 713/176 |
| 5,867,586 A | 2/1999 | Liang |
| 5,946,414 A | 8/1999 | Cass et al. |
| 5,960,081 A | 9/1999 | Vynne et al. |
| 5,974,150 A | 10/1999 | Kaish et al. |
| 6,104,812 A | 8/2000 | Koltai et al. |
| 6,139,066 A | 10/2000 | Mowry, Jr. et al. |
| 6,177,683 B1 | 1/2001 | Kolesar et al. |
| 6,209,923 B1 * | 4/2001 | Thaxton et al. ............... 283/72 |
| 6,216,228 B1 | 4/2001 | Chapman et al. |
| 6,222,650 B1 | 4/2001 | Long |
| 6,252,963 B1 | 6/2001 | Rhoads |
| 6,256,150 B1 | 7/2001 | Rosenthal |
| 6,329,987 B1 | 12/2001 | Gottfried et al. |
| 6,343,138 B1 | 1/2002 | Rhodes |
| 6,532,541 B1 * | 3/2003 | Chang et al. ............... 713/176 |
| 6,536,665 B1 | 3/2003 | Ray et al. |
| 6,636,332 B1 | 10/2003 | Soscia |
| 6,754,822 B1 * | 6/2004 | Zhao ............... 713/176 |
| 6,865,001 B2 | 3/2005 | Long et al. |
| 6,985,607 B2 * | 1/2006 | Alasia et al. ............... 382/112 |
| 7,315,629 B2 * | 1/2008 | Alasia et al. ............... 382/112 |
| 7,412,073 B2 * | 8/2008 | Alasia et al. ............... 382/100 |
| 7,421,581 B2 * | 9/2008 | Alasia et al. ............... 713/168 |
| 7,466,706 B2 * | 12/2008 | Brown et al. ............... 370/392 |
| 2001/0005570 A1 | 6/2001 | Daniel et al. |
| 2002/0042884 A1 | 4/2002 | Wu et al. |
| 2002/0054680 A1 | 5/2002 | Huang et al. |
| 2003/0012374 A1 | 1/2003 | Wu et al. |
| 2003/0012562 A1 | 1/2003 | Lawandy et al. |
| 2003/0039195 A1 | 2/2003 | Long et al. |
| 2003/0136837 A1 | 7/2003 | Amon et al. |
| 2003/0137145 A1 | 7/2003 | Fell et al. |
| 2004/0064699 A1 * | 4/2004 | Hooker et al. ............... 713/170 |
| 2004/0128512 A1 | 7/2004 | Sharma et al. |
| 2004/0236951 A1 | 11/2004 | Zhao |
| 2005/0177726 A1 * | 8/2005 | Alasia et al. ............... 713/176 |
| 2005/0237577 A1 * | 10/2005 | Alasia et al. ............... 358/3.28 |
| 2005/0276442 A1 * | 12/2005 | Alasia et al. ............... 382/100 |
| 2006/0029278 A1 * | 2/2006 | Alasia et al. ............... 382/232 |
| 2007/0057061 A1 * | 3/2007 | Alasia et al. ............... 235/454 |
| 2008/0044056 A1 * | 2/2008 | Alasia et al. ............... 382/100 |
| 2008/0044089 A1 * | 2/2008 | Alasia et al. ............... 382/232 |
| 2008/0056532 A1 * | 3/2008 | Alasia et al. ............... 382/100 |
| 2008/0144947 A1 * | 6/2008 | Alasia et al. ............... 382/232 |
| 2008/0267514 A1 * | 10/2008 | Alasia et al. ............... 382/232 |

FOREIGN PATENT DOCUMENTS

| | | |
|---|---|---|
| EP | 0598357 B1 | 5/1994 |
| EP | 1 136 947 A2 | 9/2001 |
| WO | WO 93/15491 | 8/1993 |
| WO | WO 94/07326 | 3/1994 |
| WO | WO 97/20298 | 6/1997 |
| WO | WO 99/35819 | 1/1998 |
| WO | WO 01/80512 A2 | 10/2001 |

OTHER PUBLICATIONS

"A Public Key Watermark for Image Verification and Authentication"; Ping Wah Wong, *International Conference on Image Processing and Its Applications*, London, GB, vol. 1, No. 1, Oct. 4, 1998, pp. 455-459.

European Search Report, Application No. EP 01 10 2248, Jul. 28, 2005, 3 pages.

International Search Report, PCT Application No. PCT/US2005/013069, dated Jun. 26, 2007, 4 pages.

"Watermarking for Image Authentication", Wu, et al, IEEE International Conference on Image Processing, Oct. 1998, 5 pages.

* cited by examiner

SYSTEM AND METHOD FOR DECODING DIGITAL ENCODED IMAGES

CROSS-REFERENCE TO RELATED APPLICATIONS

This application claims priority to U.S. Provisional Application No. 60/565,300 filed Apr. 26, 2004, which is incorporated herein by reference in its entirety. The application is also related to U.S. application Ser. No. 10/847,962 ('962 Application) filed May 18, 2004 and U.S. application Ser. No. 10/897,943 ('943 Application) filed May 18, 2004, each of which is incorporated herein by reference in its entirety.

FIELD OF THE INVENTION

The invention relates generally to the field of counterfeit protection, and more particularly to the field of electronic and printed document protection through the use of an encoded image.

BACKGROUND OF THE INVENTION

An emerging trend in the increasingly electronic business world is using the World Wide Web and email to provide up-to-the-minute business documents to customers and other end users. Automated document generation and electronic distribution, such as using email or web services has many advantages. It significantly reduces costs associated with pre-printing forms, document archiving, mailing, handling etc. It gives line-of-business users access to important data instantly and makes documents available to the customers at all times, around-the-clock. However, certain drawbacks are present with electronic documents, including the potential for tampering or creation of fraudulent documents that in most or all aspects resemble the original.

Many software tools have been suggested to protect the integrity and confidentiality of electronic documents. These tools, such as plug-ins, may give broad control to adding or changing notes and form fields in the electronic document, document encryption, as well as adding digital signatures to the documents.

A significant drawback in the protective measures typically used to protect documents provided in electronic format is that these measures are often useless once the document is transferred to a printed media. Further, typical hard copy protective measures may not be available to the recipient of the electronic document. For example, security ink or secure paper may be available to the document creator but not to the recipient of an electronically transmitted document. Clearly, maintaining the security of hard copies of electronically transmitted copies is problematic when the document creator has no control over the printing process. Furthermore, many desktop image-editing software tools can be used to create counterfeit printouts of even complex electronic documents. Printed documents are still widely used in many aspects of daily life, including business and government settings.

Widely used protection methods for deterring digital counterfeiting and identifying data alterations include bar codes and digital watermarking. These are usually added as an image file into a document by the originating party. However, bar-code generation software is widely available and can be used by a counterfeiter to create fraudulent documents.

Digital watermarking has also been proposed as a solution, but tests have shown that it may lack the reliability necessary for consistent and widespread use. Further, implementing such technology is often expensive, with equipment costs for the necessary hardware and software sometimes canceling the cost savings achieved through electronic document distribution. The amount of information that can be protected may often be limited to just several digits or letters. These problems put a severe constraint on reliability and usage of electronic documents in commerce and services.

Counterfeiting and alteration of printed documents and black market sales of counterfeit goods are significant problems faced with increasing regularity in today's world. Each year many millions of dollars are lost through the fraudulent use of non-authentic documents and branded goods. The increasing sophistication of optical scanners, copy machines and other devices used for replicating items continues to enhance the counterfeiter's ability to produce fraudulent documents and other imitations which are of sufficient quality to often go undetected.

Protection of documents has been accomplished through the application of encoded images. Such images typically cannot be discerned or interpreted without a specially tailored optical decoder. They may be used on virtually any form of printed document including legal documents, identification cards and papers, labels, packaging, currency, stamps, etc. The value of using non-reproducible encoded images on documents such as drivers' licenses and vehicle titles is readily apparent. They are also highly valuable in their use on packaging as a means of identifying counterfeit goods.

The use of encoded images has greatly enhanced the ability to detect counterfeit documents and documents that have been altered. There are circumstances, however, where the use of an optical decoder to detect encoded images is impractical. There are other circumstances where it may be desirable to use encoded images to protect documents even before they are printed. In both types of circumstances (and others), it may be highly desirable to have a digital or software-based decoder that can be used to decode a digitized encoded image. It may also be desirable to combine the use of encoded images with the use of other protective measures.

SUMMARY OF THE INVENTION

The present invention provides data processing systems and methods for decoding digital encoded images. An aspect of the invention provides a method for decoding an encoded image produced from a primary image and at least one secondary image using at least one encoding parameter. The encoded image is formed so that when the encoded image is printed, the secondary image is not discernible to a viewer without an optical decoding device having characteristics corresponding to the at least one encoding parameter. The method comprises obtaining a digital version of the encoded image, determining the at least one encoding parameter, and constructing a decoded image from the digital encoded image using at least one of the encoding parameters in the encoding parameter set.

Another aspect of the invention provides a method of enhancing the protection of a digital document in which a first encoded image has been embedded, the first encoded image having been constructed using a set of authentication content and a first encoding parameter set. The method comprises digitally decoding the first encoded image using the first encoding parameter set to produce a decoded image and extracting the set of authentication content from the decoded image. A second encoded image is then constructed using the set of authentication content and a second encoding parameter set.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

The present invention provides methods for decoding digital encoded images without the use of a physical optical decoding device. These methods can be used to decode digital encoded images that have never been printed and printed encoded images that have been scanned or transformed by other means into digital form. The capacity to decode digital images allows the user to tamperproof documents in both their digital and printed formats, thus bridging the digital-to-paper boundary. It also provides additional security by allowing verification of and changes to an encoded image at various stages of electronic document production, transmission and printing.

Embodiments of the present invention relate to methods for the protection of documents and other items using optically encoded images. These images are typically embedded in a background or source image and printed on items that may be subject to alteration, falsification or counterfeiting. As used herein, the term "encoded image" refers to an image that is manipulated and/or hidden within a background field or within another image in such a way that when applied or printed, the encoded image cannot be discerned by the human eye without the use of a decoding device. Some encoded images are hidden so that their presence is difficult to discern from a background or primary image. Other encoded images are easily visible but not readable because the image content has been systematically scrambled or otherwise manipulated.

Encoded images of particular significance to the present invention are those that are configured to be optically decoded using a lenticular lens. Such images take advantage of the ability of the lenticular lens to screen image content based on the lenticule frequency of the lens. These images are typically encoded by one of several methods that involve establishing a regularized periodic pattern having a frequency corresponding to that of the lenticular lens to be used as a decoder, then introducing distortions of the pattern that render the image difficult to discern with the naked eye. Encoded images of this type can be produced in an analog fashion using specialized photographic equipment as disclosed in U.S. Pat. No. 3,937,565 or digitally as is disclosed in U.S. Pat. No. 5,708,717 ('717 Patent), both of which are incorporated herein by reference in their entirety.

Figure 1:
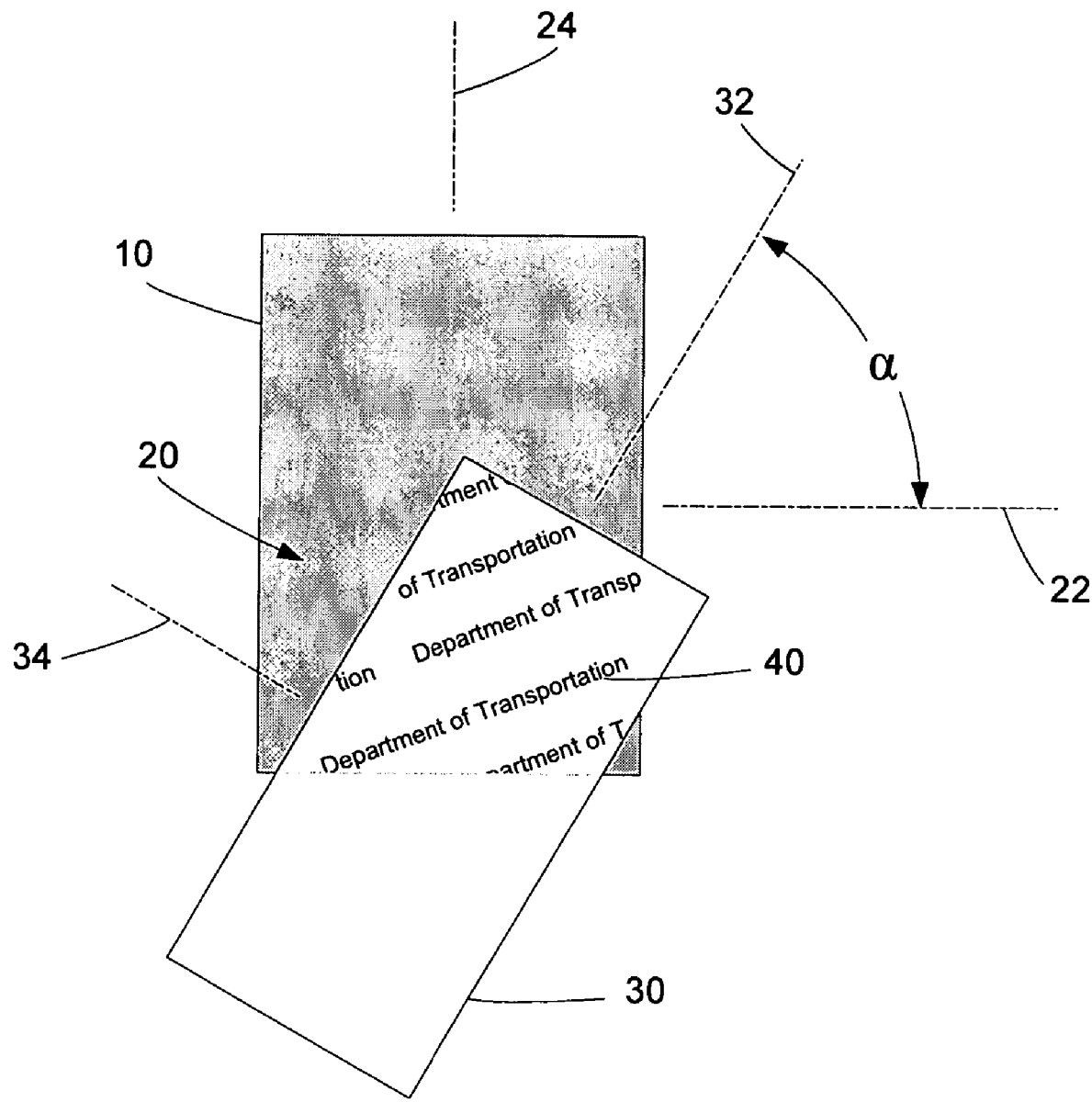
FIG. 1 is an illustration of the use of an optical decoder to decode a printed encoded image.

Digitally encoded images can be embedded into a background or into other images so that the mere presence of the encoded image is difficult to discern. With reference to FIG. 1, an encoded image 10 may be established using a primary or source image 20 and a secondary image 40 which is embedded into the primary image 20 in such a way that the secondary image 40 can only be viewed with a decoding device 40 of a predetermined frequency. The primary image may be a blank gray or colored background image as in the encoded image 10 of FIG. 1 or may include visible image content such as a design or photograph or any other form of indicia. The secondary image may also be any form of image or indicia and may include indicia related in some way to the primary image. In the example encoded image 10, the secondary image 40 is a repeating pattern based on the words "Department of Transportation." The secondary image can be separately encoded then merged or embedded into the primary image or the process of embedding may be accomplished in such a way that the secondary image is encoded as it is embedded. As shown in FIG. 1, the secondary image may be viewed by placing the decoding device 40 over the encoded image 10 at the correct orientation. In the example of FIG. 1, the decoding device has a horizontal axis 32 and a vertical axis 34 and the encoded image 10 has a horizontal axis 22 and a vertical axis 24. The secondary image 40 is revealed when the horizontal axis 32 of the decoding device 40 is oriented at the decoding angle α with respect to the horizontal axis 22 of the encoded image 10. The decoding angle α is an encoding parameter that is established prior to encoding and embedding the secondary image.

The methods by which the secondary image is embedded or merged with the primary image can be divided into two general approaches. In the first approach, a regularized periodic behavior is imposed on the primary image using a predetermined frequency. This is primarily accomplished by rasterizing the primary image at the predetermined frequency. The secondary image is then mapped to the primary image so that the regularized behavior of the primary image can be altered at locations corresponding to those in the secondary image that include image content. The alterations are small enough that they are difficult for the human eye to discern. However, when a lenticular lens having a frequency corresponding to the predetermined frequency is placed over the primary image, it will screen the primary image content in such a way that the alterations are brought out to form the latent secondary image.

In the second approach, the regularized periodic behavior is first imposed on the secondary image rather than the primary image, with alterations in that behavior occurring wherever there is content in the secondary image. The secondary image is then mapped to the primary image and the content of the primary image altered pixel by pixel based on the content of the encoded secondary image.

Figure 2:
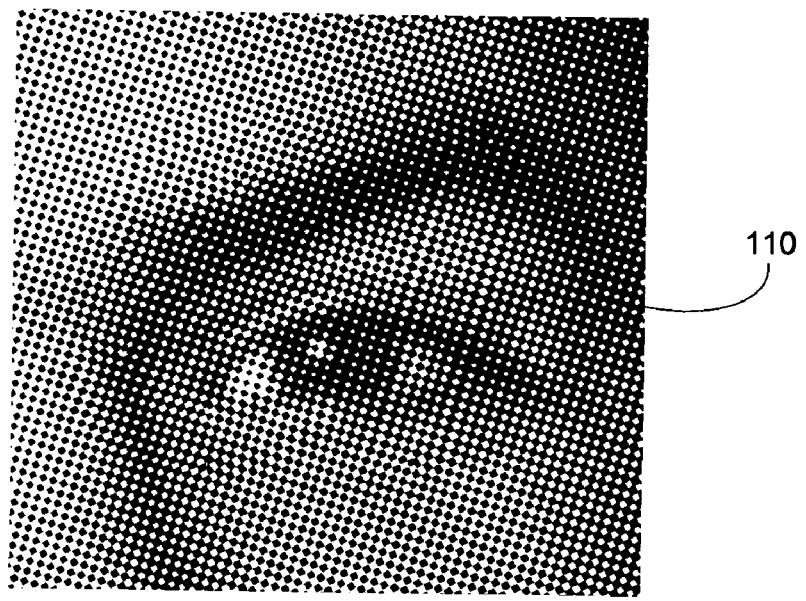
FIG. 2 is an illustration of an exemplary rasterized encoded image formed from primary and secondary images using a raster shifting method.
Figure 3:
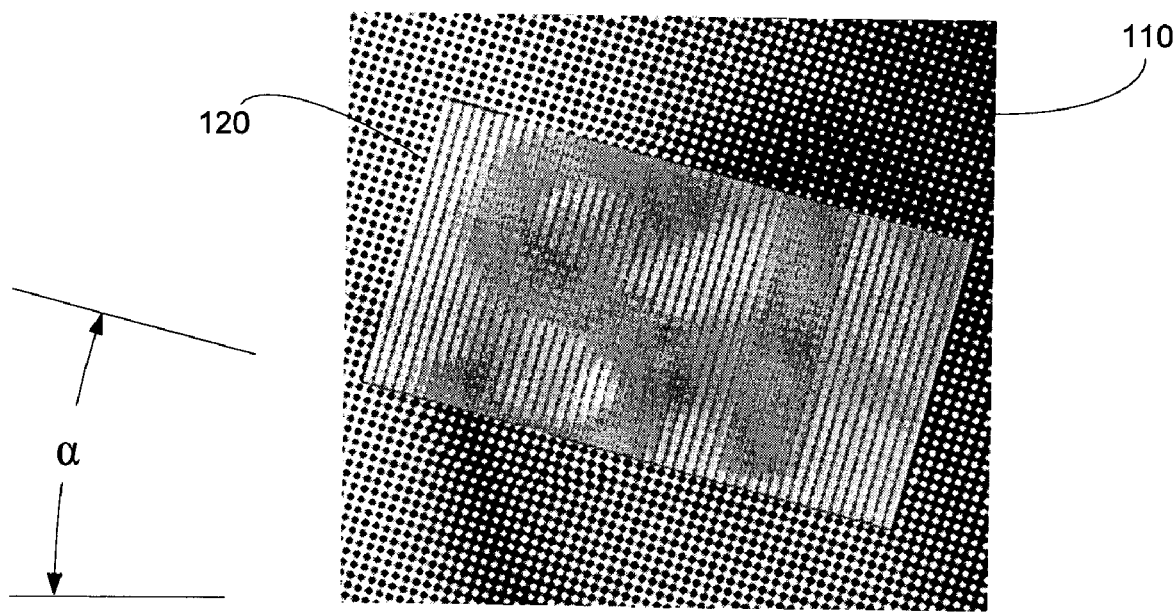
FIG. 3 is an illustration of the use of an optical decoder to decode the encoded image of FIG. 2.

Examples of the above approaches will now be discussed in more detail. A simple example of the first approach is illustrated in FIGS. 2-3. FIG. 2 shows an enlarged view of an optically encoded image 110. The encoded image 110 was constructed from a primary image of a human face and a secondary image of the letters "SI." The primary image was rasterized at a particular screen frequency and raster angle α. The secondary image was embedded into the primary image by introducing position variations (shifting) in the raster elements at locations corresponding to the content of the secondary image. These shifts can be made small enough that it is difficult if not impossible for the naked eye to interpret them as a cohesive image embedded in the primary image. Their presence can be further disguised by making the transition from an unshifted raster portion of the image to a shifted portion as gradual and smooth as possible. The result, as shown in FIG. 2 is an encoded image 110 in which the primary image is readily viewed but the secondary image cannot easily be discerned. As shown in FIG. 3, when a lenticular decoding lens 120 having a line frequency corresponding to the screen frequency is placed over the encoded image 110 at the correct orientation (i.e., the raster angle α), the secondary image (the letters "SI") may be viewed.

The presence of the embedded image may be further disguised by compensating for changes in the tone density of small regions or windows of the primary image. This can be accomplished by modifying the individual pixels in the shifted image so that the average tone density of each window remains the same as the corresponding window of the unshifted image.

It will be understood by those of ordinary skill in the art that the above method may be used with any form of dot, symbol or line rasterization methodology. Further, this and other methods may be used to embed multiple secondary images having different encoding parameters as described in the co-pending '962 and '943 Applications).

A somewhat similar method to that described above is disclosed in the '717 Patent. In that method, the secondary image is encoded first using the scrambling methodology described in the '717 Patent and the raster lines of the primary image are then reformed to follow the pattern of the encoded secondary image. The resulting embedded image can be viewed using a lenticular decoding device having the same frequency at which the primary image was rasterized and with which the secondary image was encoded.

The second general approach for embedding a secondary image into a primary image may be used if it is desired for the output image to be a continuous tone image (as opposed to the rasterized image produced by the first approach). In this method, a secondary image is embedded into a "blank" control image having no content other than regular periodic tonal variations. The control image with the embedded secondary image is then mapped to the primary image.

Figure 4:
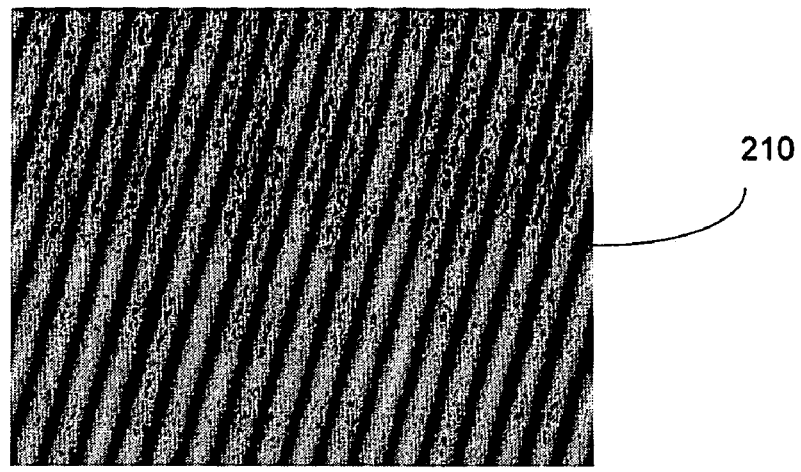
FIG. 4 is an illustration of a blank control image having periodically varying tone density.
Figure 5:
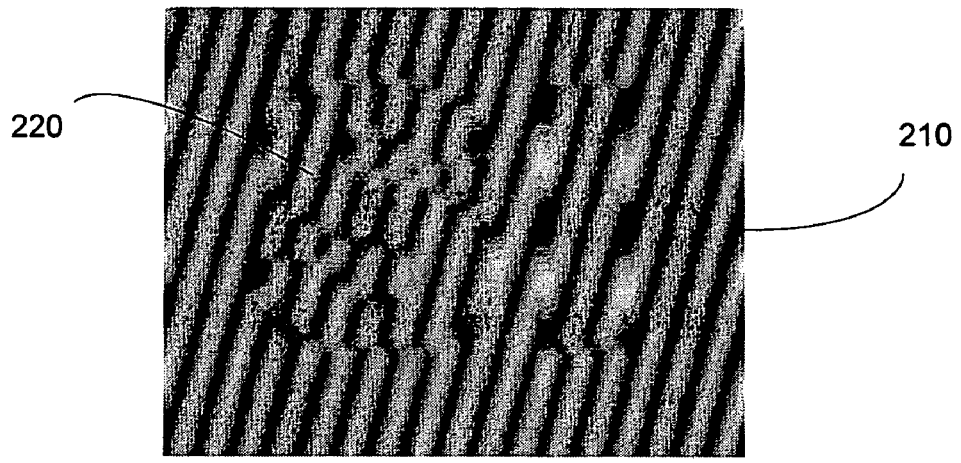
FIG. 5 is an illustration of the control image of FIG. 4 with a secondary image embedded therein.
Figure 6:
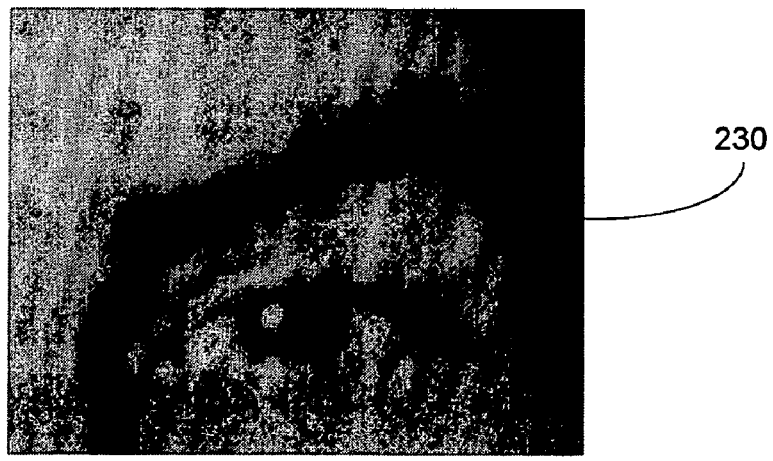
FIG. 6 is an encoded image formed from a primary image and the control image of FIG. 5.

With reference to FIGS. 4-6, a simple example of this method will now be discussed. FIG. 4 shows a blank control image 210 in which the tonal values of pixels of the image change as a periodic function, such as a square wave, sine wave, triangle wave etc. The frequency of this function matches the frequency of the lenticular decoding lens. The angular orientation of the periodic variation establishes the angle used to decode the encoded image. As shown in FIG. 5, a secondary image 220 is embedded into the control image 210 by shifting the phase of the periodic function at any location corresponding to a content location in the secondary image. In this way, the deviations in the regularized tone variations in the modified control image 210 correspond to the content of the secondary image.

The modified control image 210 is then mapped pixel by pixel to a primary image 230. Pixels of the primary image 230 are lightened or darkened to match the pattern of tonal variations of the corresponding pixels in the control image 210. The final encoded image is shown in FIG. 6. The actual amount of lightening or darkening of the primary image pixels may be determined using transformation functions, usually defined as lookup tables. These functions may differ depending on the image application. For example, the transformation functions may be designed specifically for use with a specific printing process (e.g. ink jet, dye sublimation, laser printing).

It will be understood by those of ordinary skill in the art that the above method may be used to embed multiple secondary images having different encoding parameters as described in co-pending '962 Application and '943 Application.

The output of any of the above methods may be a printed encoded image (i.e., a combined primary and latent secondary image printed on a document or other item) or may be a digital encoded image that may be transmitted or stored for later use.

Another method of embedding an image is commonly used in banknotes and checks. In this method, a latent image is created by changing the direction of raster elements in the visible images at positions corresponding to the content in the hidden image. For example, vertical raster lines in the primary image may be changed to horizontal lines at the locations corresponding to the latent image. The latent image can typically be seen by tilting the banknote slightly. However, the deviations in the primary image can also be decoded using an optical decoder. This is because the raster lines of the primary image will run along the length of the lenticular line of the decoder at the positions where there is no hidden content, but will have only a cross section at the positions where there is a hidden content. This difference makes the hidden image appear much brighter than the visible when viewed through the decoder.

The common thread of all of the above methods and the resulting encoded images is that they involve deviations from regular periodic behavior (e.g., spatial location, tone density, raster angle). These deviations are made apparent through the use of a lenticular decoding lens having a frequency corresponding to that of the regular behavior. The frequency of the behavior may be equal to the lens frequency or may be an even multiple of the lens frequency. The lenticular lens acts as a content screen that emphasizes the deviations from the regularized behavior and assembles them into the secondary image.

A lenticular lens can be used to decode both visible encoded images whose content has been systematically scrambled and encoded images embedded into a primary image or background. There are, however, many circumstances where the use of a physical (i.e., hardware) decoder is impractical or impossible. The present invention therefore provides methods for decoding digitized encoded images without the use of a physical optical decoding device. In particular, the present invention provides methods that can be incorporated into a software-based decoder that can be used to decode digital encoded images. Decoder embodiments of the invention may be adapted to decode any digital encoded image including digital encoded images that have never been printed and printed encoded images that have been scanned or transformed by other means into digital form. The digital encoded images may be latent images embedded into background or primary images or may be visible images that have been systematically scrambled or manipulated.

Methods of decoding digitized encoded images according to the invention will now be described. Unless stated otherwise, the encoded images to be decoded involve a primary image with a secondary image embedded in such a way that it can be viewed (decoded) using a lenticular lens. The primary image may be a blank image with no discernible content (e.g., a gray box) or may be an actual image with discernible content.

The methods of the invention may be divided into two types: (1) methods that require information on the content of the primary image, the secondary image or both the primary and secondary images; and (2) methods that do not require any foreknowledge regarding image content. Both method types require knowledge of the encoding parameters used to encode and embed the secondary image. Specifically, the line frequency and the line angle used to encode the image must be known.

Figure 7:
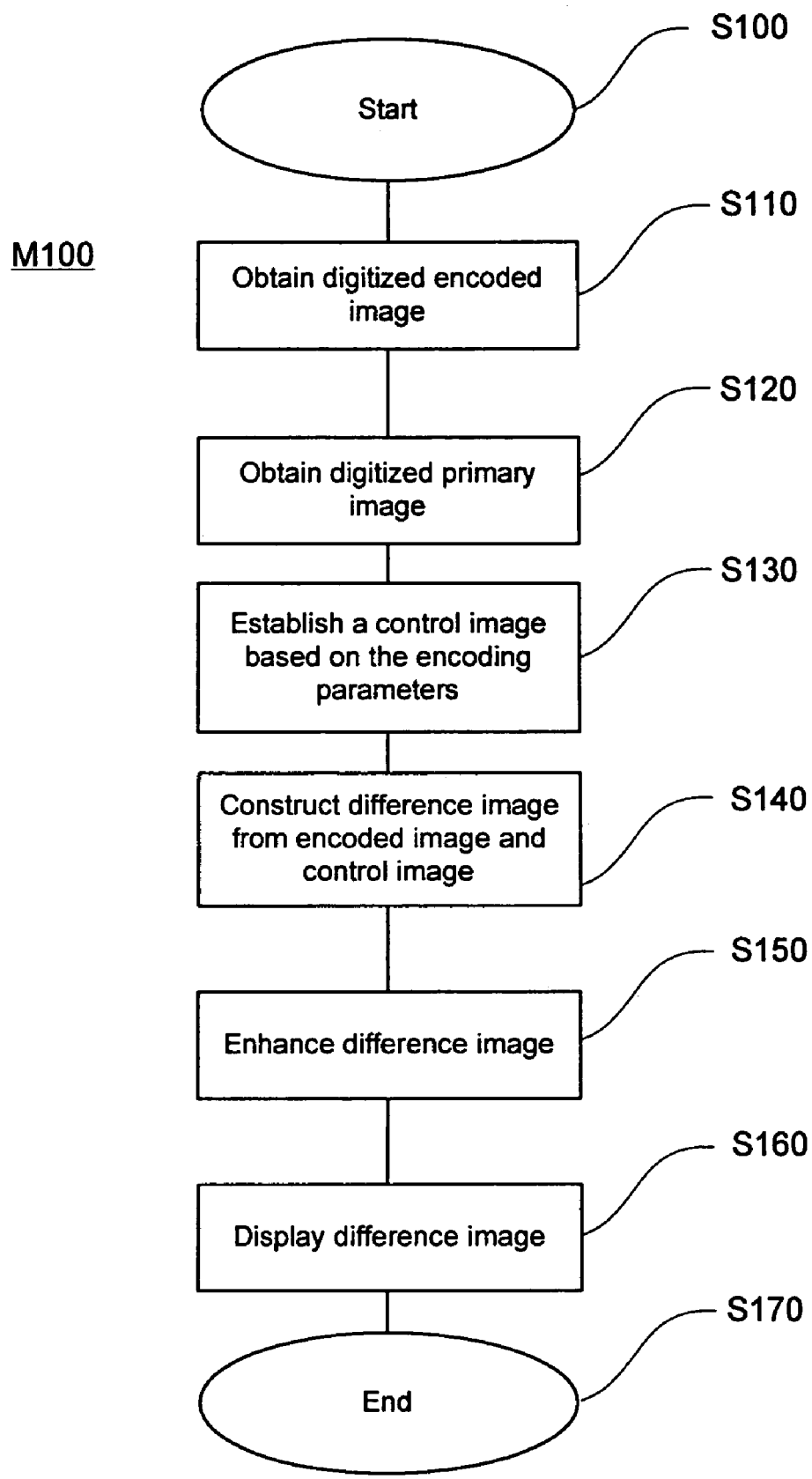
FIG. 7 is a flowchart of a method of decoding a digital image according to an embodiment of the invention.

FIG. 7 shows the steps in a method M100 according to an embodiment of the invention that can be used to decode an encoded image when the unmodified primary image is known or available. The method starts at S100. At S110, a digitized copy of the encoded image is obtained. The digitized encoded image may be a version of the encoded image that is the direct output of an automated encoding process. Such a digitized encoded image may be stored for later retrieval by a decoding processor or may be transmitted from the originator to a decoding processor. It will be understood by those of ordinary skill in the art that a digitized encoded image of this type may never have been printed on a document, product, label or other authenticable item. Because the encoded image is provided in its original, digitized form, there is a minimal possibility of distortion having been introduced into the encoded image that would affect the decoding process. Moreover, the orientation of the encoded image is precisely known.

In an alternative to the above, the digitized encoded image may be obtained by scanning or otherwise reproducing an encoded image that has been printed on a document, product, label or other authenticable item. If the digitized encoded image is obtained in this manner, steps must be taken to assure that the relative orientation of the encoded image is carefully controlled (such as by controlling the orientation of a document relative to the scanning device) or can be ascertained (such as by including orientation indicia in or near the encoded image that will allow a decoding process to assure proper orientation of the image for decoding).

At S120, a digitized copy of the original primary image used to produce the encoded image is obtained. In many instances, the digitized primary image may be obtained from the encoding processor or may by retrieved from data storage where it was placed at the time the encoded image was produced. Alternatively, the primary image may be obtained from the source that provided the image to the encoding processor. At S130, the digitized primary image is rasterized to produce a control image. This rasterization is accomplished using the encoding parameters that were used to produce the encoded image. In particular, the primary image is rasterized using the same raster angle and line frequency as were used by the encoding processor to produce the encoded image. In some instances, the copy of the primary image received from the encoding processor or retrieved from data storage may already have been rasterized using these parameters. In such a case, the previously rasterized primary image is established as the control image.

It will be understood that if the primary image is nothing more than a blank background image, the control image will resemble the control image of FIG. 4. Otherwise, the control image is essentially a variation of the digitized encoded image without the secondary image embedded in it.

At S140, a pixel-by-pixel comparison is made of the control image and the digitized encoded image to create a difference image. The difference image may be a composite of tone values established for each pixel based on whether there is a difference between the control image and the encoded image for that pixel. For example, a pixel in which the content of the encoded image is different from the corresponding pixel of the control image may be assigned a value of "true" and the corresponding pixel in the difference image is set to "1" (corresponding to white). A pixel in which the content of the encoded image is the same as the corresponding pixel of the control image may be assigned a value of "false" and the corresponding pixel in the difference image is set to "0" (corresponding to black).

The resulting difference image is a reconstruction of the secondary image used with the primary image to produce the encoded image. The quality of the difference image may be enhanced at S150 using known image enhancement methods including but not limited to application of median or low-pass filters, adaptive image filters, morphological processing, and custom designed image enhancements methods. At S160, the difference image may be displayed on a terminal screen, stored or printed. It will be understood by those of ordinary skill in the art that the difference image may be displayed before, after or during, any enhancement steps. The method ends at S170.

The quality of the decoded image produced using the method M100 may be affected by the method by which the digitized encoded image is obtained. The highest fidelity is obtained when the encoded image is the exact output of an automated encoding process and the rasterized primary image is that used in the encoding process. Somewhat lower fidelity is obtained when the encoded image is obtained by digitizing or otherwise capturing a digital version of a printed encoded image using an image acquisition device. This is because both the printing and image acquisition (e.g., scanning) processes introduce size distortions and tone and structure variations that can affect the decoding result. Also, misorientation of the encoded image relative to the image acquisition device can cause the digitized encoded image to be out of alignment with the control image when the comparison is done. As discussed above, these effects can be reduced through careful control of the image acquisition process and/or by including alignment keys in or around the encoded image when it is printed.

As used herein, the term "image acquisition device" means any device or system used to capture or produce a digitized image from a printed image or object. Image acquisition devices include but are not limited to scanners, digital cameras, and systems having a combination of an analog camera and a frame grabber. The image acquisition device may be adapted for capturing images using light in the visible or non-visible (e.g., UV and IR) portions of the spectrum.

Figure 8:
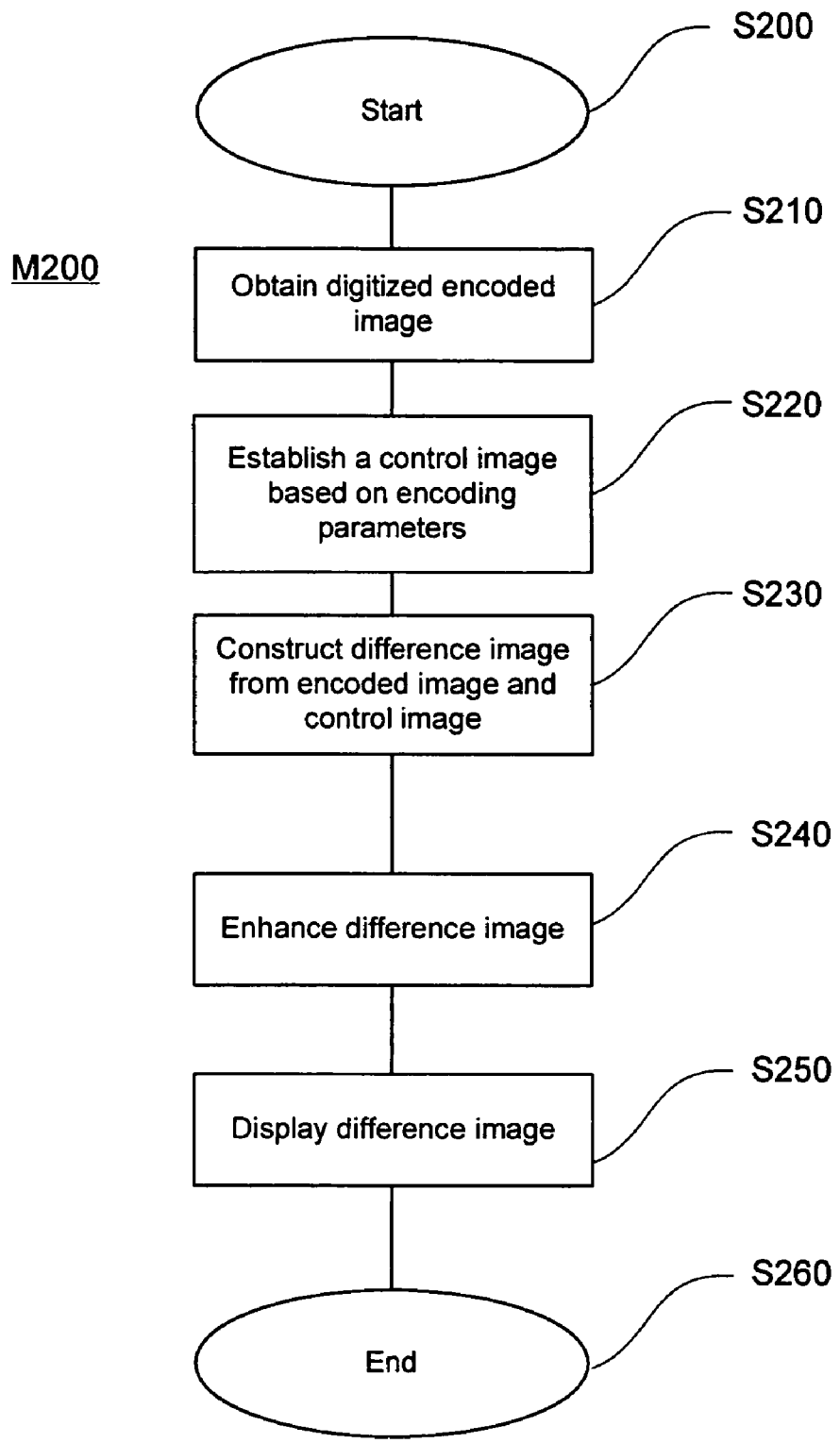
FIG. 8 is a flowchart of a method of decoding a digital image according to an embodiment of the invention.

As noted above, method M100 requires that the primary image be available. For many applications, this is not practical. Accordingly, some methods of the invention do not have this requirement. FIG. 8 shows the steps in a method M200 of decoding an encoded image that is similar to the above except that the control image is always a rasterized blank image (e.g., a rasterized gray box). The method begins at 200. At S210, a digitized copy of the encoded image is obtained. As in the previous method, this may be an original, unmodified digitized encoded image or may be a captured image obtained from a document or other item on which the encoded image had been printed. At S220, a control image is established by rasterizing a blank image using the raster angle and frequency corresponding to the encoding parameters used to encode the encoded image. A difference image is then constructed at S230. The difference image may be constructed using the same pixel-by-pixel differencing method used in the method of FIG. 7. Enhancement techniques may be applied to the difference image at S240 and the image may be displayed at S250. The method ends at S240.

If the primary image used to produce the encoded image is a blank image, the decoded image resulting from method M200 will be exactly the same as with the method M100 of FIG. 7. If, however, the primary image actually contains visual information, the decoded image resulting from method M200 will appear significantly different from a decoded image produced using method M100. This is because in method M100, the primary image is filtered out of the encoded image. In method M200, however, the difference image will include elements of both the secondary image and the primary image. In the resulting decoded image, the decoded secondary image appears to be superimposed over the primary image. Depending on the content of the two images this can make it more difficult to discern or interpret the secondary image.

Some methods of decoding digitized encoded images according to the invention were developed as a way of more closely emulating the actions of a lenticular lens decoder. A lenticular lens allows a viewer to see linear samples of an image taken at intervals determined by the frequency of the lenticular lens. The lens magnifies these samples and human vision interpolates them into a continuous picture. When oriented at the proper angle, this causes deviations from primary image characteristics having the same frequency to be sampled and magnified, thus standing out from the primary image. The action of the lens is essentially to assemble periodic samples of the encoded image into a reconstruction of the secondary image.

Figure 9:
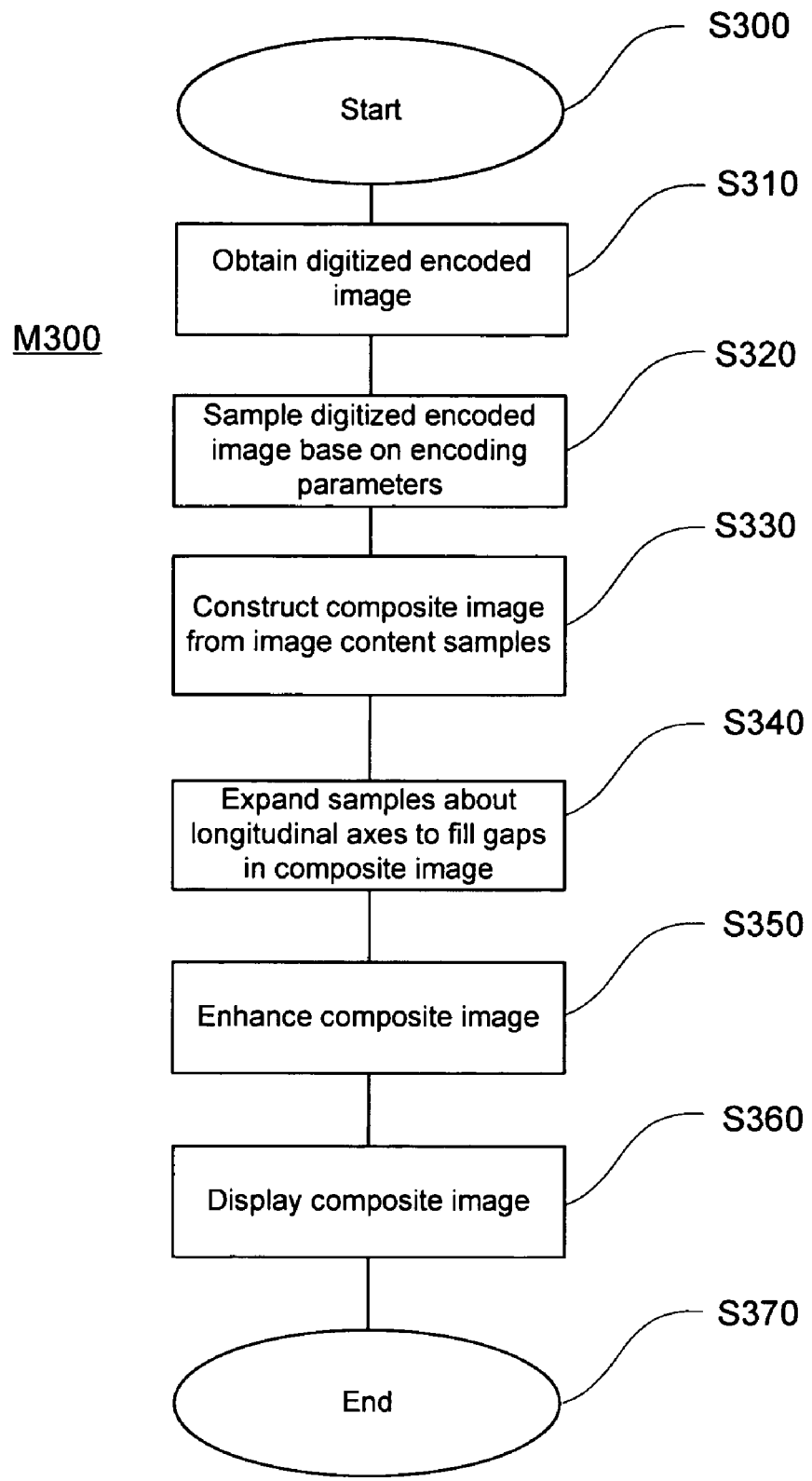
FIG. 9 is a flowchart of a method of decoding a digital image according to an embodiment of the invention.
Figure 10:
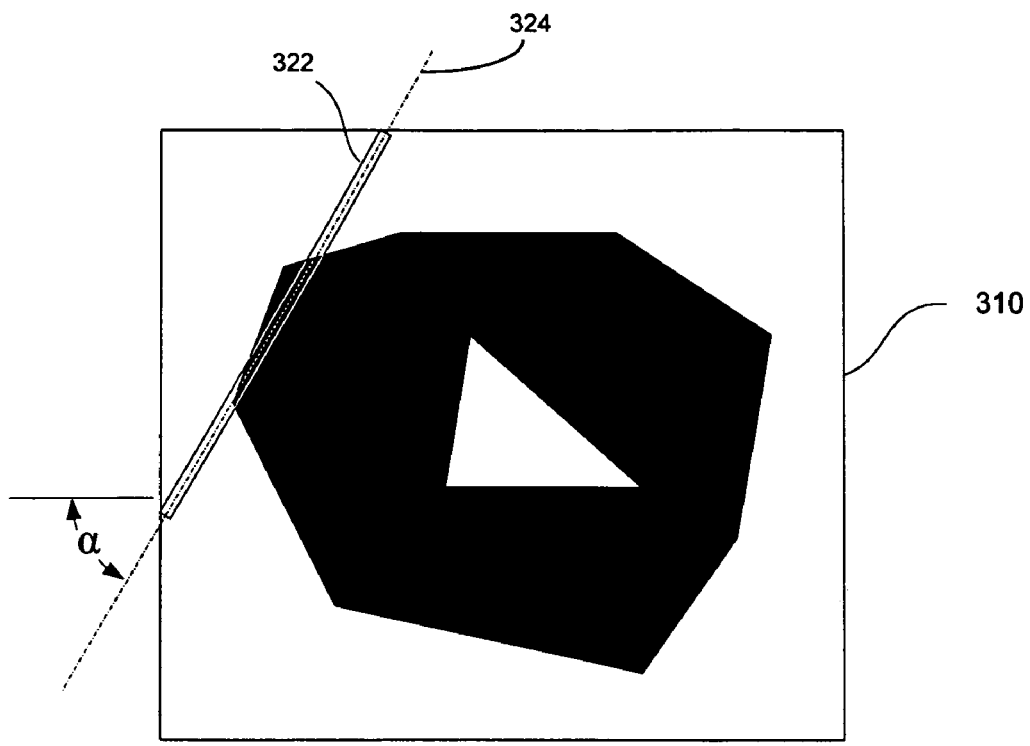
FIG. 10 is a schematic representation of the sampling of an encoded image.
Figure 11:
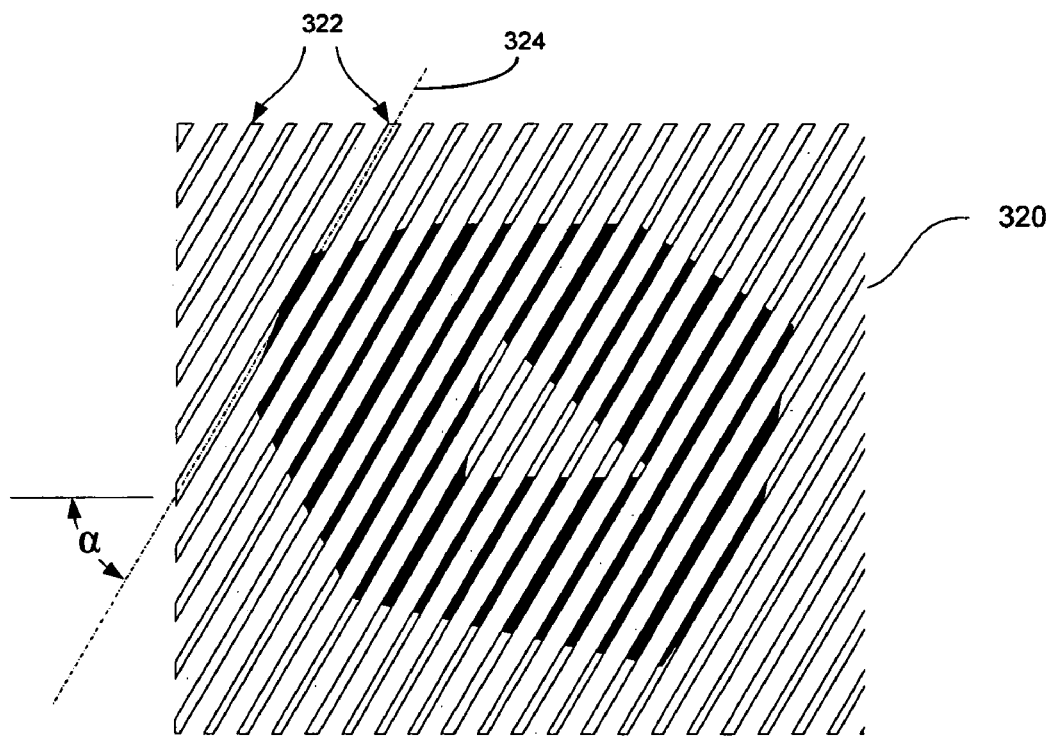
FIG. 11 is a schematic representation of a composite image formed from samples of the encoded image of FIG. 10.

FIG. 9 is a flow chart of a method M300 of decoding a digitized encoded image using a sampling approach that is similar to the action of a lenticular lens. The method starts at S300. At S310, a digitized copy of the encoded image is obtained. As in the previous methods, this may be an original, unmodified digital encoded image or may be a captured image obtained from a document or other item on which the encoded image had been printed. At S320, a series of elongate rectangular image content samples are taken from the digitized encoded image. These samples are taken at a frequency corresponding to the line frequency used to encode the encoded image and are oriented and the encoding angle used to encode the encoded image. FIGS. 10 and 11 illustrate how the image content samples are taken. FIG. 10 shows a representation of a digitized encoded image 310 and a single sample 322. The sample 322 has a longitudinal axis 324 that is oriented at the decoding angle α with respect to the horizontal axis of the encoded image 310. Comparable samples 322 are taken across the entire encoded image 310 at a frequency corresponding to the frequency used to encode the encoded image 310. The sample width can be defined to match the actual sampling of a lenticular lens decoder, or it can be preset to some small fixed width.

At S330, the image content samples are combined to form a composite sample image in which the samples are each maintained in the same relative position relative to the other samples. FIG. 11 illustrates a composite sample image 320 formed from the samples 322 taken from the encoded image 310. As can be seen in the illustrative example of FIG. 11, the composite sample image has gaps between the samples. At S340, each image sample is expanded perpendicular to its longitudinal axis to close the gap with its neighboring samples. This emulates magnifying action of the lenticular lens decoder. The expansion may be accomplished using any image resizing algorithm known in the art. The resulting complete composite image provides a reconstruction of the secondary image along with elements of the primary image. This image may be enhanced and/or displayed at S350 and S360 as in the previous methods. The method ends at S370.

Like method M200 of FIG. 8, method M300 does not require that the source image be known in advance. Also like method M200, method M300 produces a decoded image that includes some of the elements of the primary image. The decoding results of method M300 are generally better than those of method M200, however, because this method tends to suppress the primary image elements to a higher degree.

The result of this method can be improved further by constructing one or more additional composite images from additional sets of samples taken at the same frequency and orientation, but slightly shifted from the original samples. Combining these composite images together may help to further suppress the elements of the primary image and/or enhance the strength of the secondary image in the perceived decoded image. This procedure can be described as creating several layers of samples and combining them using different techniques known in the art for flattening multiple layers (e.g. applying dissolve, multiply, average, overlay, difference, exclusion or other common operation or sequence of operations). As an example of the value of an additional composite image, it can be seen that in certain parts of an encoded image, the raster lines of the primary image may be so thick that they block or cover the raster deviation originating from the secondary image elements. Taking a second set of samples at a small distance from this position may reveal the local secondary image element much better. Averaging the two sample sets may result in improved overall perception of the secondary image. In another example, averaging a bigger number of sample sets and filtering them with low-pass filter may yield the reconstruction of the primary image, which can be used to further suppress primary image from the decoded image. It will be understood that there is no limit to the number of samples sets and composite sample images that may be used.

Method M300 is of particular value in decoding captured encoded images. It will be understood that the image acquisition process can introduce size and tone variations that can affect the decoding result. More importantly, the orientation of the encoded image relative to the image acquisition device may be highly variable. The results of any of the above methods can be improved by incorporating certain features into the image at the time of encoding. This may include markers at predetermined locations that allow for the identification and correction of misorientation and distortion. It may also include image density standards that allow for correction of tone density.

Performance of the various decoding methods may also be improved through the selection of the form and content of the secondary images. This may involve the use of, for example, black and white squares, bar codes and other symbology instead of plain text or image-based indicia.

It will be understood that the decoding methods described above and digital image decoders constructed to implement these methods can be adapted for use in decoding any encoded image that may be decoded using a lenticular lens decoder. Moreover, the methods and decoders of the invention may be used to decode any encoded image that has been encoded based on regular periodic variations in a standalone encoded image (e.g., a visible "scrambled" image) or in a primary image or background in which a latent image is embedded. In some embodiments of the invention, the sensitivity of the decoding methodology far exceeds that of an optical decoder. This allows the production and use of encoded images based on very small periodic variations that an optical decoder would not be able to discern.

As discussed in the '962 and '942 Applications, multiple secondary images may be encoded into a single encoded image, each secondary image being encoded using a different set of encoding parameters. The above-described decoding methods may be used to decode any number of secondary images embedded in such an encoded image. The method is simply repeated for each secondary image using its associated encoding parameters.

As also discussed in the '962 and '942 Applications, an encoded image may be generated for embedding into a digital document using some combination of encoding parameters that may include user-supplied parameters, non-user-supplied parameters or both user-supplied and non-user-supplied parameters. In one embodiment, the encoded image is based in part on information extracted from the document and may be embedded back into the digital document. At any time thereafter, software configured to carry out one of the above-described digital decoding methods can be used to extract/decode the encoded image (or images) from the digital document. Information in the decoded images (or images) may then be compared with the information in the digital document to see if the document has been tampered with since it was protected. This comparison may be done either manually by the document user (e.g., by displaying the encoded images on a monitor and visually comparing information from the displayed images with the data in the digital document) or automatically (e.g., by extracting text from the decoded images through Optical Character Recognition software and matching this text with appropriate parts of the digital document).

Figure 12:
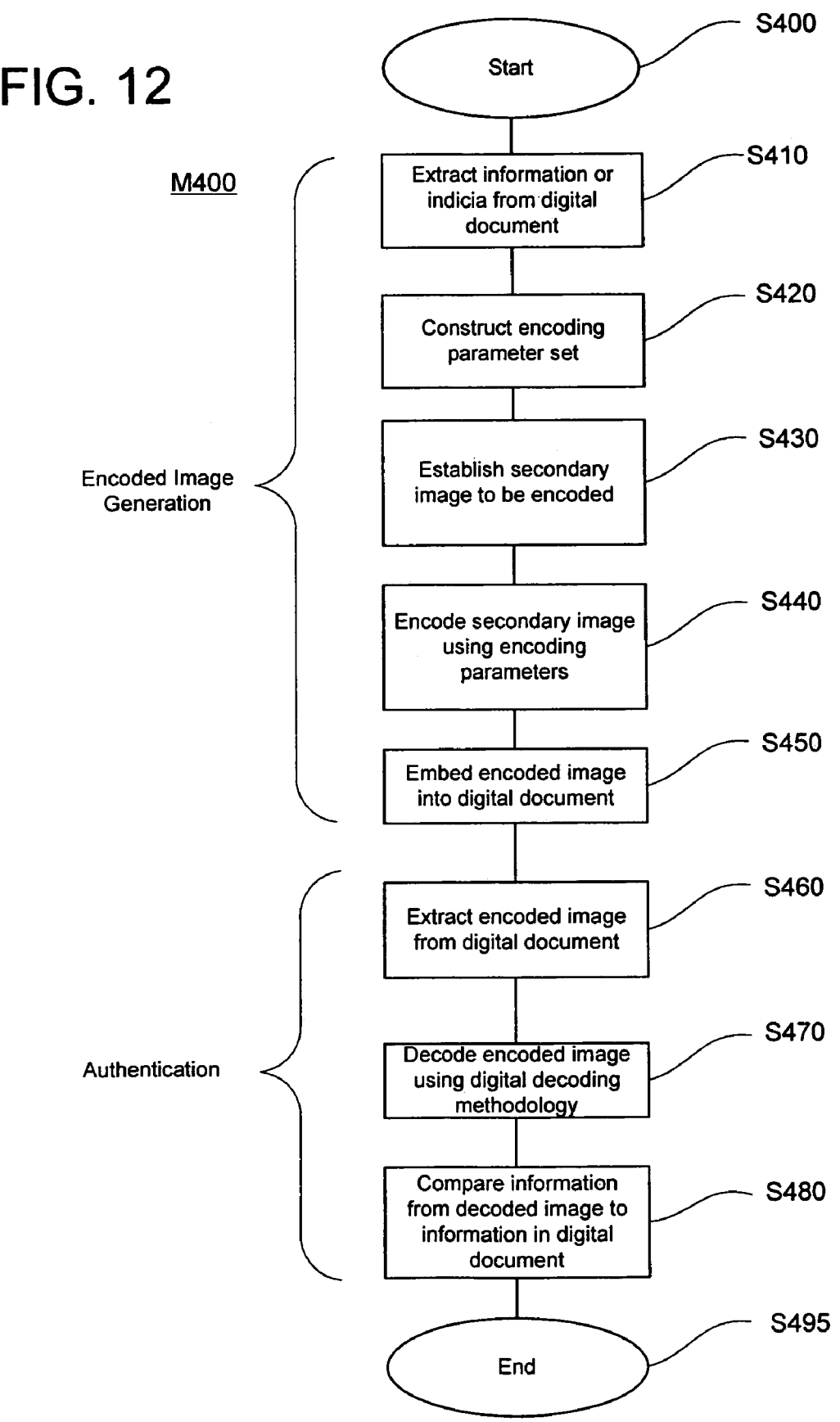
FIG. 12 is a flowchart of a method of protecting and authenticating a digital document according to an embodiment of the invention.

A method M400 of protecting and authenticating digital documents in this manner is shown in FIG. 12. The method begins a S400 and at S410 information is extracted from a digital document that is to be protected. This information may include graphical images, text or other indicia and/or may include an interpretation or summary of some portion of the content of the document. The information may be identified and extracted manually or automatically. At S420 an encoding parameter set is constructed. The encoding parameter set may be a combination of user-supplied and non-user-supplied parameters and may include parameters derived from the information extracted from the digital document. At S430, a secondary image to be encoded is established. This secondary image may be user-supplied or non-user-supplied. The secondary image may be based on or include some or all of the information extracted from the digital document. At S440 and S450, the secondary image is encoded and embedded into the digital document. It will be understood that depending on the encoding method used, S440 and S450 may be carried out as a single combined operation. In some methods, the encoded image may be created and stored or transmitted to a user for later incorporation into the digital document. It will be understood that multiple secondary images may be encoded and embedded into the digital document, each such image being encoded based on its own encoding parameter set. The various encoded images may each be formed from any combination of user-supplied and non-user-supplied images and encoding parameters.

The protected digital document may then be transmitted, stored, printed or otherwise processed. At any time subsequent to the incorporation of the encoded image into the digital document, the authenticity of the digital document can be verified using the authentication portion of the method. At S460 and S470, the encoded image is extracted from the digital document and decoded. The encoded image may be decoded using any digital decoding method including those described above. In preferred embodiments, the digital decoding method is incorporated into software for use in automatically extracting and decoding encoded images from a digital document. In a particular embodiment, OCR or other optical recognition software may be used to interpret the content of and/or extract information from the decoded image (s). At S480, information from the decoded image is compared to information extracted from the digital document being authenticated. If the information in the digital document being assessed does not match the information gleaned from the encoded image, the user may be alerted that there has been an unauthorized change to the digital document or that the digital document is not authentic. The method ends at S495.

It will be understood that the authentication portion of method M400 may be separated from the encoded image generation portion and that the authentication action may be carried out on any digital document purported to be authentic and unaltered. The various encoding and decoding actions may be carried out as combination of automated and non-automated functions. It will also be understood that the input of the authentication portion of method M400 is not restricted to the original digital document; if the document was printed, filmed or otherwise transformed, it can be digitized to reproduce the digital document using an image acquisition device and then undergo the authentication portion of method M400.

Figure 13:
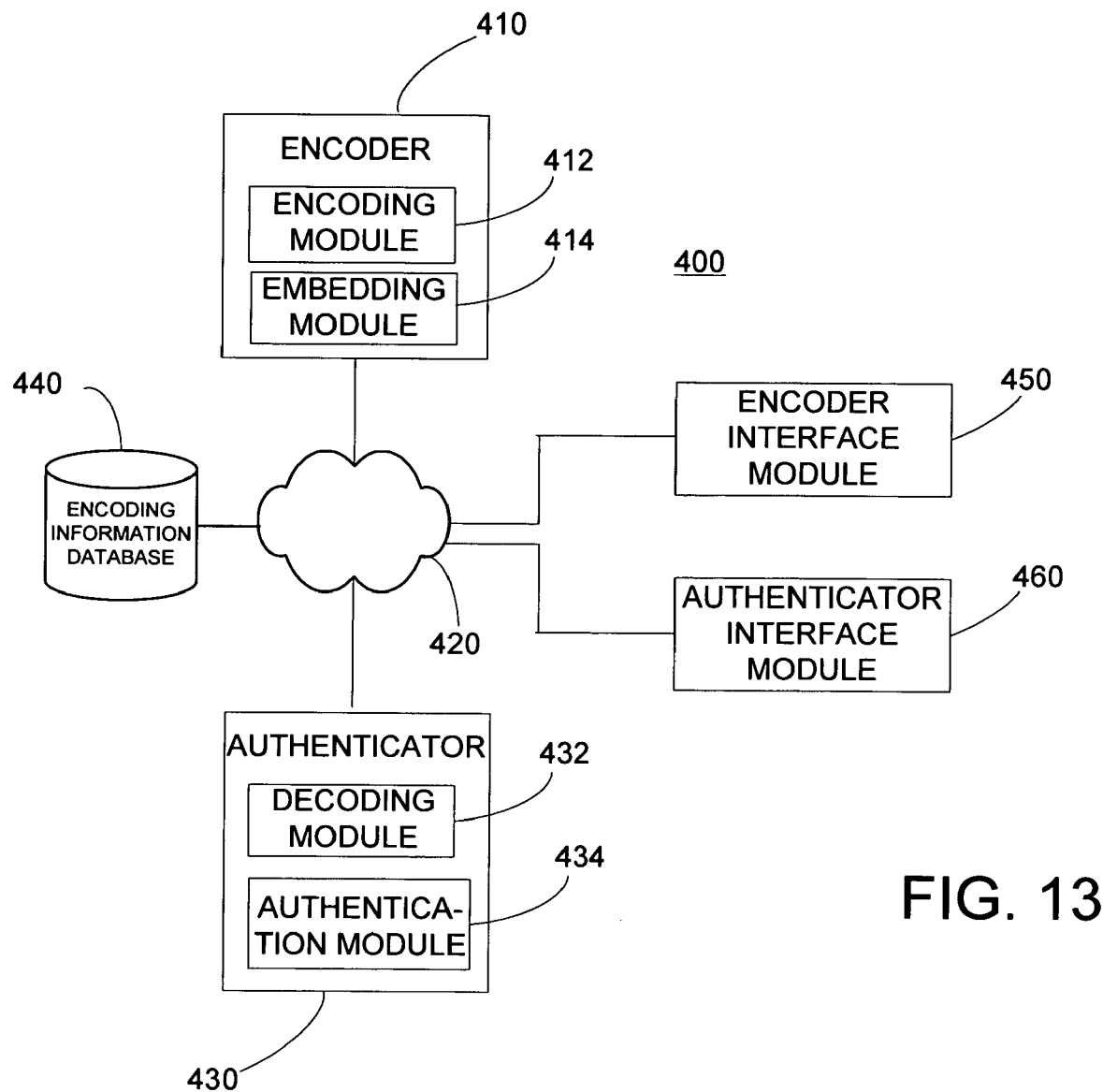
FIG. 13 is a schematic representation of a system for protecting and authenticating digital documents according to an embodiment of the invention.

FIG. 13 depicts a system 400 for authenticating digital documents in which the encoding and embedding functions are carried out by an encoder portion 410 and the decoding and authenticating functions are carried out by an authenticator portion 430. The encoder portion 410 may include an encoding module 412 and an embedding module 414, either or both of which may be in communication with an encoding information database 440. The encoding module 412 is adapted or programmed for producing an encoded image using an encoding parameter set and an authentication image that may include or be derived from content extracted from a digital document. Some or all of this information may be received from an encoder interface module 450 adapted to provide an interface between a user or document processing module and the encoder portion 410. The encoding module 412 may store either or both of the encoding parameter set and the authentication image in the encoding information database 440 for later use in authenticating the digital document. The encoding module 412 may also store the encoded image in the database 440 and/or return the encoded image to the encoder interface module 450. The encoding processor 412 may also provide the encoded image to the embedding module 414, which is adapted for embedding the encoded image into the digital document or a portion of the digital document. The digital document with the embedded image can then be returned to the encoder interface module 450.

The decoder portion 430 may include a decoding module 432 and an authentication module 434, either or both of which may be in communication with the encoding information database 440. The decoding module 432 is adapted for retrieving the encoding parameters and/or the authentication image from the encoding information database and for carrying out the digital decoding methodology of the invention to decode the digital encoded image using the encoding parameters. The decoding module 432 may also be adapted for receiving the digital document to be authenticated and extracting the encoded image from the digital document. The digital document may be received from an authenticator interface 460 that is adapted as an interface between an authentication requestor and the authenticator portion 430. After decoding the encoded image, the decoding module 432 may return the decoded image to the authenticator interface and/or forward the decoded image to the authentication module 434. The authentication module 434 is adapted to extract content from the decoded image that may be compared to authorization criteria or to content extracted directly from the digital document. The authentication module 434 may be adapted to retrieve such digital document content or may be adapted for extracting it from the digital document. The authentication module 434 may further be adapted for determining an authentication result and returning that result to the authenticator interface. The authentication module 434 may include OCR software or bar-code interpretation software, which can be used to extract information from the decoded image and/or the digital document.

It will be understood that the encoding module 412, embedding module 414, decoding module 432, authentication module 434, encoding information database 440, encoder interface module 450 and authenticator interface module 460 may be distributed among one or more data processors. All of these elements may for example be provided on a single user data processor. Alternatively, the various components of the system 400 may be distributed among a plurality of data processors in selective communication via a network 420.

Figure 14:
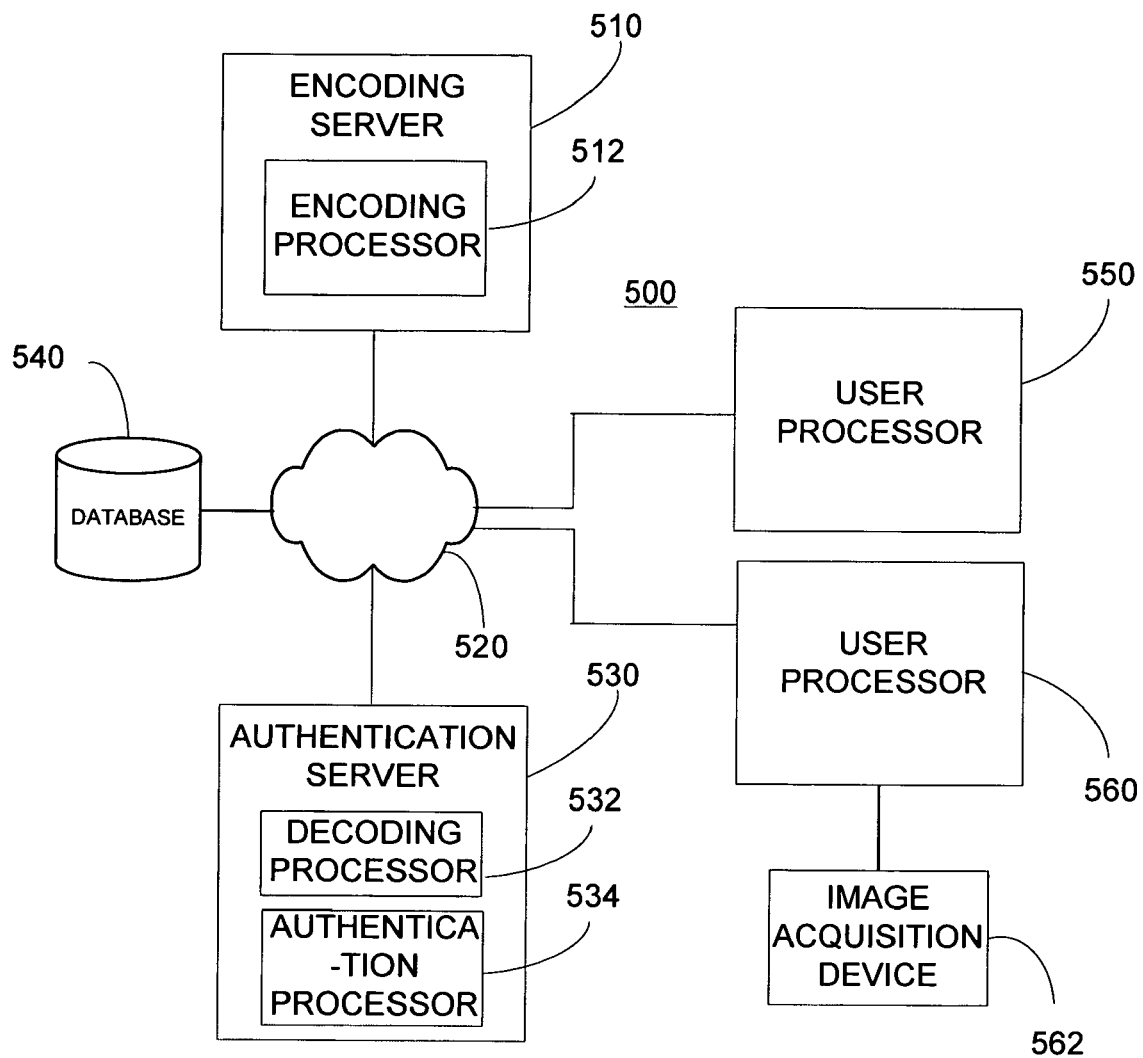
FIG. 14 is a schematic representation of a system for protecting and authenticating digital documents according to an embodiment of the invention.

FIG. 14 depicts an exemplary system 500 for authenticating digital documents in which the various system functions are carried out on a plurality of processors interconnected by a network. In this system, the encoding functions are carried out on an encoding processor 512 that is part of an encoding server 510 and the decoding functions are carried out by a decoding processor 532 that is part of an authentication server 530. The encoding processor 512 may be in selective communication with a first user processor 550 over a network 520. The decoding processor 532 may be in selective communication with a second user processor 560 over a network 520. The encoding processor 510 and the authentication server 530 are both in communication with or have selective access to a database 540. This access may be via the same network 520 or a different network or via another communications link. It will be understood that in certain embodiments a predefined fixed set of encoding/decoding parameters may be used, thus eliminating the need to store these parameters in the database 540. It will also be understood that in certain embodiments, the encoding processor 512 and the decoding processor 532 may be located in a single server. It will also be understood that various aspects of the encoding and decoding procedures may be further distributed among multiple processors, including a combination of the encoding/decoding processors and the user processors 550, 560. The user processors 550, 560, encoding processor 512 and decoding processor 532 can also be modules of a single processor or server or individual processors connected by a local area network.

In a typical operating scenario, a user desiring to protect a digital document submits an encoded image request through the first user processor 550 to the encoding server 510. The request may include some or all of the encoding parameters and may include an authentication image to be encoded. In some embodiments, the request may also include some or all of the digital document itself. The encoding processor 512 produces an encoded image using an encoding parameter set based at least in part on information supplied by the user in the request. The encoding parameters used to produce the encoded image may also include non-user supplied information. The encoding processor 512 may store either or both of the encoding parameters and the authentication image(s) in the database 540 for later use in authenticating the digital document. The encoding processor 512 may also store the encoded image in the database 540 and/or transmit the encoded image back to the user processor 550 (or another user processor) for embedding into the digital document. Alternatively, encoding processor 512 can embed the encoded image into the digital document or a portion of the digital document and then transmit the digital document to the user processor 550.

The digital document may then be printed, stored or transmitted to other processors including the second user processor 560. The authenticity of the document, whether in digital or printed form, can be verified at any time. If the document is in digital form, it can be transmitted by the user processor 560 to the authentication server 530 for authentication. The decoding processor 532 receives the request for authentication and retrieves the associated encoding parameters from the database 540. The decoding processor 532 then uses the encoding parameters and the digital decoding methodology of the invention to decode the digital encoded image. The authentication server 530 may also include an authentication processor 534 adapted for processing and comparing the output of the decoding processor to criteria for authentication. In general, the authentication criteria are constructed so that material alterations or unauthorized production can be identified, but that variations due to loss in fidelity or due to the presents of elements of a primary image are ignored. The authentication processor 534 may include OCR or bar-code interpretation software, which can be used to extract information from the decoded encoded image. The authentication processor 534 may also be adapted to extract information or indicia from the digital document for comparison to indicia in or information extracted from the decoded encoded image.

If the document has been printed, the authenticity of the document may be verified using an optical decoder having characteristics corresponding to the encoding parameters used to produce the encoded image. Alternatively, the printed document may be captured using a scanner or other image acquisition device 562 to produce a captured digital image. The captured digital image can then be transmitted by the user processor 560 to the authentication server 530 for authentication. The captured digital image can then be authenticated using the decoding processor 532 and the authentication processor 534 in the same manner as the unprinted digital document.

It will be understood that document protection through the generation of an encoded image can be performed either by the document author, or by some other user in the document management system. The protected document can be stored in a database or immediately sent to other users through Internet or Intranet (or other network). In some embodiments of the invention, software adapted for performing the digital decoding of encoded images may reside on any user processor. This software will only be usable to decode encoded images if the encoding parameters are available to that user. If a digital document recipient has the decoding software and access to the encoding parameters, that recipient can use the decoding software to see if the document has been tampered with since it was protected. If the recipient prints the digital document, the document is protected by the encoded image printed with the document.

The use of a digital decoder (i.e., any form of digital data processor adapted for decoding digital encoded images according to methods of the invention) eliminates the need to print a document in order to verify its authenticity or to verify that it has not been tampered with. Further, because the document may be verified in its digital format, there may be no need for an optical decoder with characteristics matching the encoding parameters of the encoded image(s) in the document. A system using a combination of a digital decoder and an optical decoder enables the authentication of the same document in both digital and printed form, thus crossing the digital-to-paper boundary.

A digital decoder may be any data processor having software for implementing one or more of the digital decoding methods of the invention. A digital decoder may also be or include a hardware implementation of one or more decoding methods. Such hardware may include, for example, digital signal processors (DSPs) or other programmable devices, or a series of hardware elements adapted for executing the sequence of operations described above.

As discussed above, a digital decoder may be used to extract and decode digital encoded images from unprinted electronic documents or printed/captured documents. In some embodiments, the digital decoder can also be used to extract and decode encoded images embedded in holograms and diffraction gratings.

Figure 15:
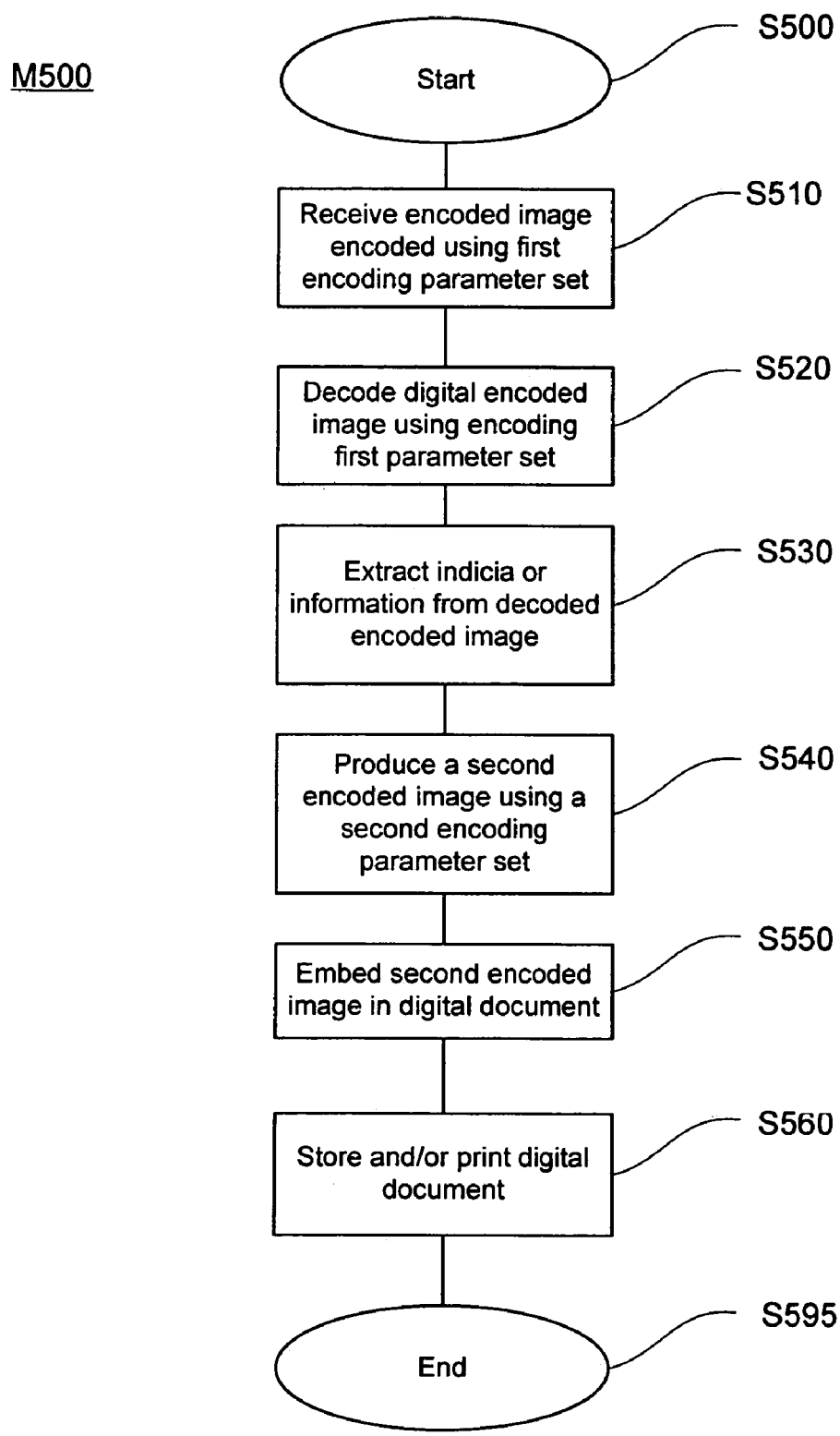
FIG. 15 is a flowchart of a method of protecting and authenticating a digital document according to an embodiment of the invention.

Accordingly, another aspect of the invention provides a security product that makes a document's transition from digital to paper form more secure. This product may be referred to as an encoded image exchange (or switch) module. This security feature changes the encoding parameter set used for document protection on the fly when the document is printed. The encoded image exchange module is adapted to carry out a method of exchanging the encoding parameters used in an encoded image. A method M500 according to one embodiment is shown in FIG. 15. The method begins at S500 and at S510, a first encoded image is received. This image was encoded using a first encoding parameter set. The first encoded image may be a newly produced encoded image received directly from an encoding processor, a previously produced encoded image retrieved from storage, or an extracted image taken from a digital document. In some instances, the first encoded image may have been embedded into a digital document to protect the document in its unprinted state, but the user wishes to change the encoded image prior to printing.

Regardless of its source, the first encoded image is decoded at S520 using a digital decoder. Particular indicia or a portion of the image may then be extracted from the decoded image at S530. Some or all of the decoded image or information extracted from the decoded image is then re-encoded at S540 using a second encoding parameter set. The encoded image produced with the second encoding parameter set may then be embedded in a digital document at S550. If the original encoded image was extracted from a digital document, the second encoded image may be embedded back into the same digital document as a replacement for the original encoded image. The digital document is stored and/or printed at S560. When the digital document is printed it will include the second version of the encoded image. The method ends at S595.

In some embodiments, the re-encoding action S520 of protection enhancement method M500 may be carried out immediately prior to printing the digital document. As a result, unauthorized printing of a previously intercepted or appropriated version of the electronic document will produce a copy of the document that includes the first encoded image, not the second. Subsequent authentication of the unauthorized copy will thus reveal its counterfeit nature. It can be seen that multiple applications of the actions of the method M500 at various stages of document generation and transmission may be used to determine the point at which the digital document was misappropriated.

The two encoding parameter sets used in the method M500 may be made mutually exclusive. For example, the parameter sets may be constructed so that an optical decoder configured to decode the second encoded image (after the digital document has been printed) would not be able to decode the image encoded using the first parameter set if that image were printed and the digital decoder (operating with the first encoding parameter set) would not be able to decode the second encoded image encoded using the second parameter set. Alternatively, a user of the digital decoder may be given access to both first and second encoding parameter sets. In this case the digital decoder could be used to decode both the first and second encoded images, while the optical decoder is limited to decoding only the second encoded image.

In a particular embodiment of the protection enhancement method M500, the first encoded image may incorporate elements of other security enhancement measures such as a digital watermark or bar-code. For example, a first encoded image may include a bar-code or watermark, which itself can be decoded using bar-code or watermark recognition and/or translation software and the first encoding parameter set. The decoded image can then be encoded a second time using the second encoding parameter set as described above. This embodiment may be extended even further if the first encoded image is formed as a lenticularly decodable image of the bar-code or water mark. The first encoded image may be decoded using a first encoding parameter set to obtain the bar-code or watermark, which can then be decoded using bar-code recognition and/or translation software and a second encoding parameter set. The decoded information may then be re-encoded using one or more additional encoding parameter sets.

Encoded image exchange creates a security barrier at the point of digital-to-paper document conversion. Only a user having the proper encoded image exchange software can produce a printed document that can be verified by the corresponding optical decoder. Let's say that a hacker breaks into a database of digital documents, downloads them and prints them. Since the hacker does not have the encoded image exchange software, the encoded images will not be re-encoded before printing. Thus, the documents cannot be authenticated with the corresponding optical decoder. The barrier may be set to work in the other direction as well: If someone scans the printed document to convert it to the digital format, or creates a counterfeit document using a text editing software and inserts a captured encoded image into it, the digital decoder would not be able to decode the captured encoded image.

An encoded image exchange module can also be used for more complex authorization schemes within the document management system. For example, all users with a digital decoder module can verify the document in its digital form, but only the authorized users with an encoded image exchange module can produce the printed copy that decodes with the proper optical decoder, thus revealing that the certain copy of the document has been printed with proper authorization. This level of control may be particularly important if a digital document must be approved by several users before publishing it, or if the document is a unique one and only one copy must be published, or if every paper copy of the document has a monetary value.

In a variation of the image exchange method, one encoded image may be made readable by both digital decoder and an optical decoder, while a second encoded image is encoded using the encoded image exchange module. This may enable tracking the source of a document that is detected as a counterfeit by either the digital decoder or the optical decoder.

It will be understood that instead of using an optical decoder, a combination of an image capturing device and a digital decoder may be used. In this case, the digital decoder used for authentication of the captured and re-digitized printed document may be preset to use the second encoding parameter set, which matches the one used by the encoded image exchange module.

In some applications, the previously-described encoding methods may be used to produce multiple levels of encoding. This may be accomplished by encoding an already-encoded image a second time. For example, an encoded image may be formed from a first secondary image and a first primary image. That encoded image may then be used as a second secondary image that can be used with a second primary image to form a second encoded image. The second encoded image may be produced using a different encoding parameter set or even a different encoding methodology. The process can be repeated any number of times, thus creating multiple levels of encoding.

If optical decoders are used for decoding hidden information, the top level secondary image will be revealed by using the decoder that matches the last encoding process. Then another decoder may be placed over the first to reveal the secondary image from the previous level and so on.

As an alternative to the use of multiple optical decoders, the digital decoders of the present invention may be used to decode multiple-level encoded images by simply applying and reapplying the decoding steps using the appropriate encoding parameters. The digital decoders of the invention are especially appropriate for this use because of their sensitivity, flexibility and ease of use. For example, in software-based decoders, the encoding parameters used can be adjusted easily and can be readily controlled so that unauthorized decoding of a particular encoded image level can be prevented.

In another approach to multiple-level encoding, the optical image encoding processes described above may be combined with other image hiding or disguising methods. For example, a digital image including a digital watermark or bar code may be used as a secondary image that is then encoded using one of the above optical encoding methods (or another method for producing an image decodable using a lenticular lens). Alternatively, an encoded image may be used in a digital watermark or embedded into a bar code image. Once again, the digital decoders of the present invention may provide a significant advantage in the decoding of individual levels of the encoding hierarchy.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Methods for protecting documents according to the invention should not be confused with systems for the encryption of emails and digital documents. Encryption renders an entire document unreadable for unauthorized users or interceptors. In contrast, the methods of the present invention involve encoding and embedding images that provide for tamper proofing of the document but do not involve disguising the document's content. A digital document protected using the methods of the invention (i.e. a document having an encoded image embedded therein) may also be encrypted and decrypted with no effect on the tamper protection afforded by the invention. This provides an additional level of protection that allows users to create complex multi-level protection systems. In such systems, encryption would protect against unauthorized viewing or interception during electronic transmission, and use of an encoded image would protect against tampering with document content and against counterfeiting.

While the foregoing illustrates and describes exemplary embodiments of this invention, it is to be understood that the invention is not limited to the construction disclosed herein. The invention can be embodied in other specific forms without departing from its spirit or essential attributes.

What is claimed is:

1. A method of authenticating a digital document in which an encoded image has been embedded, the encoded image having been constructed using a plurality of encoding parameters and authentication content extracted from the digital document, the method comprising:
   extracting the encoded image from the digital document;
   digitally decoding the encoded image to produce a decoded image using the encoding parameters;
   extracting decoded image content from the decoded image; and
   comparing the decoded image information to the extracted authentication content.

2. A method according to claim 1 wherein the authentication content comprises an authentication image.

3. A method according to claim 1 wherein the authentication content comprises document specific data that are substantially unique to the digital document.

4. A method according to claim 1 wherein the action of comparing the decoded image content to the extracted authentication content includes:
   determining whether the extracted decoded image content matches the authentication content.

5. A method according to claim 1 wherein the authentication content has been stored in a database and the action of comparing the decoded image content to the extracted authentication content includes:
   retrieving the authentication content from the database.

6. A method according to claim 1 wherein the action of comparing the decoded image content to the extracted authentication content includes:
   extracting the authentication content from the digital document.

7. A method according to claim 1 wherein the digital document comprises a captured digital image of printed indicia including the encoded image.

8. A method according to claim 7 wherein the captured digital image is captured using an image acquisition device.

9. A method according to claim 8 wherein the image acquisition device is one of the set consisting of an optical scanner, a digital camera, and a system including an analog camera and a frame grabber.

10. A method of enhancing the protection of a digital document in which a first encoded image has been embedded, the first encoded image having been constructed using a set of authentication content and a first encoding parameter set, the method comprising:

digitally decoding the first encoded image using the first encoding parameter set to produce a decoded image;

extracting the set of authentication content from the decoded image; and constructing a second encoded image using the set of authentication content and a second encoding parameter set.

11. A method according to claim 10 wherein the authentication content comprises data that are substantially unique to the digital document.

12. A method according to claim 11 further comprising:

printing the digital document with the second encoded image embedded therein.

13. A method according to claim 12 further comprising:

receiving an authenticable document for authentication, the authenticable document having an authenticable encoded image embedded therein; and authenticating the authenticable document by attempting to decode the authenticable encoded image using the second encoding parameter set.

14. A method according to claim 10 further comprising:

extracting the first encoded image from the digital document.

15. A method according to claim 10 further comprising:

embedding the second encoded image into the digital document.

16. A method according to claim 10 wherein the digital document comprises a captured digital image of printed indicia including the encoded image.

17. A method according to claim 16 wherein the captured digital image is captured using an image acquisition device.

18. A method according to claim 17 wherein the image acquisition device is one of the set consisting of an optical scanner, a digital camera, and a system including an analog camera and a frame grabber.

* * * * *

UNITED STATES PATENT AND TRADEMARK OFFICE
CERTIFICATE OF CORRECTION

PATENT NO. : 7,512,249 B2  
APPLICATION NO. : 11/068350  
DATED : March 31, 2009  
INVENTOR(S) : Alfred V. Alasia et al.

Page 1 of 1

It is certified that error appears in the above-identified patent and that said Letters Patent is hereby corrected as shown below:

Column 20, line 13, Claim 17, cancel the text beginning with "17. A method" to and ending "acquisition device."
column 20, line 14 and insert the following claim:

--17. A method of authenticating a digital document in which an encoded image has been embedded, the encoded image having been constructed using a plurality of encoding parameters and authentication content extracted from the digital document so that if the encoded image is printed, the authentication content of the encoded image is not discernible to a viewer without an optical decoding device having characteristics corresponding to one or more of the encoding parameters, the method comprising:
extracting from the digital document the encoded image constructed so that if the encoded image is printed, the authentication content of the encoded image is not discernible to a viewer without an optical decoding device having characteristics corresponding to one or more of the encoding parameters; digitally decoding the encoded image to produce a decoded image using the encoding parameters; extracting decoded image content from the decoded image; and comparing the decoded image information to the extracted authentication content.--

Signed and Sealed this

Twelfth Day of May, 2009

JOHN DOLL  
*Acting Director of the United States Patent and Trademark Office*

UNITED STATES PATENT AND TRADEMARK OFFICE
CERTIFICATE OF CORRECTION

PATENT NO. : 7,512,249 B2
APPLICATION NO. : 11/068350
DATED : March 31, 2009
INVENTOR(S) : Alfred V. Alasia et al.

It is certified that error appears in the above-identified patent and that said Letters Patent is hereby corrected as shown below:

Column 18, line 22, Claim 1, cancel the text beginning with "1. A method" to and ending "authentication content."
column 18, line 22 and insert the following claim:

--1. A method of authenticating a digital document in which an encoded image has been embedded, the encoded image having been constructed using a plurality of encoding parameters and authentication content extracted from the digital document so that if the encoded image is printed, the authentication content of the encoded image is not discernible to a viewer without an optical decoding device having characteristics corresponding to one or more of the encoding parameters, the method comprising:
    extracting from the digital document the encoded image constructed so that if the encoded image is printed, the authentication content of the encoded image is not discernible to a viewer without an optical decoding device having characteristics corresponding to one or more of the encoding parameters; digitally decoding the encoded image to produce a decoded image using the encoding parameters; extracting decoded image content from the decoded image; and comparing the decoded image information to the extracted authentication content.--

This certificate supersedes the Certificate of Correction issued May 12, 2009.

Signed and Sealed this

Seventh Day of July, 2009

JOHN DOLL
*Acting Director of the United States Patent and Trademark Office*